L. PRAY.
Vehicle Seat.
No. 77,838.
Patented May 12, 1868.
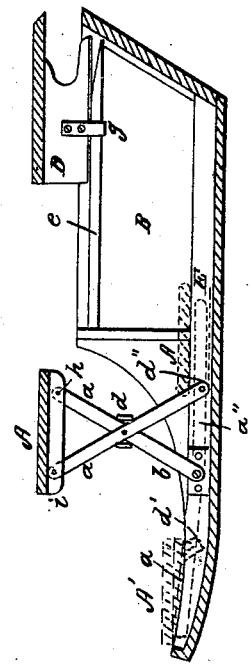
Witnesses:
W. C. Ashkettle
Wm A Morgan.
Inventor:
Lewis Pray.
per Munn & Co.
Attorneys.

UNITED STATES PATENT OFFICE.

LEWIS PRAY, OF PORTLAND, MAINE.

IMPROVEMENT IN SEAT FOR VEHICLES.

Specification forming part of Letters Patent No. 77,838, dated May 12, 1868.

*To all whom it may concern:*

Be it known that I, LEWIS PRAY, of Portland, in the county of Cumberland and State of Maine, have invented new and useful Improvements in Seats for Vehicles; and I do hereby declare that the following is a full, clear, and exact description thereof, which will enable those skilled in the art to make and use the same, reference being had to the accompanying drawings, forming part of this specification, in which the drawing represents a central vertical section of a buggy having my improved seat.

The object of this invention is to provide a movable folding seat for buggies and other light vehicles, where it is frequently desirable to economize space.

In the accompanying plate of drawings, the body of a buggy is shown at B, having a sliding seat, D, movable to and fro on the ledge or guide $e$, and held thereon by the plate-hook $g$. The folding seat A is supported by the crossed and pivoted legs $a\, a$, as shown. One leg at each end of the seat A is pivoted at $b$ to the bed-frame E of the body, and the other is pivoted to the seat, as shown at $i$. The crossed legs are pivoted, as shown, and the same pivot also passes through a bracing-plate, $d$, having its ends turned up, as shown, to limit the spread of the legs $a\, a$.

When both seats are to be used, the seat D is moved back to the position shown, and the jump-seat (so called) adjusted as shown, thus making a two-seated vehicle where there was before but one seat.

When the rear seat, D, only is needed, the same is brought forward, and the jump-seat is folded under and out of the way, as shown at the red outlines $A''\, a''\, d''$, or the same may be folded down onto the front of the vehicle, as shown at $A'\, a'\, d'$, if desired to employ the whole of the rear of the body to convey parcels or packages.

Thus by my invention a jump-seat is provided which is more stable, easily and compactly put out of the way, than the similar seat heretofore made.

I claim as new and desire to secure by Letters Patent—

The combination of the jump-seat A, upheld by cross-legs $a\, a$, and pivoted, as shown and described, in combination with the sliding seat D of a vehicle-body, all substantially as and for the purpose set forth.

The above specification of my invention signed by me.

LEWIS PRAY.

Witnesses:
S. C. STROUT,
THOMAS G. LORING.